United States Patent [19]

Kanai et al.

[11] Patent Number: 4,828,214

[45] Date of Patent: May 9, 1989

[54] SLIDE RAIL DEVICE FOR VEHICLE SEAT

[75] Inventors: Masatatsu Kanai; Muneharu Urai, both of Akishima, Japan

[73] Assignee: Tachi-S Company Limited, Tokyo, Japan

[21] Appl. No.: 156,523

[22] Filed: Feb. 16, 1988

[51] Int. Cl.$^4$ ............................................. A47C 1/023
[52] U.S. Cl. .................................. 248/430; 297/346; 248/420
[58] Field of Search ............... 248/430, 429, 424, 419, 248/393, 420; 297/318, 322, 346, 329

[56] References Cited

U.S. PATENT DOCUMENTS

| | | | |
|---|---|---|---|
| 3,926,397 | 12/1975 | Hunwicks | 248/430 |
| 4,262,963 | 4/1981 | Bauer et al. | 248/430 X |
| 4,422,612 | 12/1983 | Frank | 248/430 |
| 4,533,107 | 8/1985 | Okazaki et al. | 248/430 |
| 4,776,551 | 10/1988 | Nishino | 248/429 |

FOREIGN PATENT DOCUMENTS

| | | | |
|---|---|---|---|
| 2545763 | 4/1977 | Fed. Rep. of Germany | 248/430 |
| 3221959 | 12/1983 | Fed. Rep. of Germany | 248/429 |
| 3226585 | 1/1984 | Fed. Rep. of Germany | 248/429 |
| 2282349 | 4/1976 | France | 248/430 |
| 126228 | 7/1983 | Japan | 248/429 |
| 2128472 | 5/1984 | United Kingdom | 248/429 |

*Primary Examiner*—Robert W. Gibson, Jr.
*Assistant Examiner*—Karen J. Chotkowski
*Attorney, Agent, or Firm*—Browdy & Neimark

[57] ABSTRACT

A slide rail device for a vehicle seat adapted for adjustment of fore-and-aft positions of the seat, comprising an upper rail fixed to the seat and a lower rail slidably fitted to the upper rail, with one end of a seat belt being secured to the upper rail, in which the lower rail encloses the upper rail, with such an arrangement that an upper inverted-U-shaped portion of the lower rail is disposed above a substantially U-shaped shoulder portion of the upper rail, a lateral wall portion of the lower rail is inclined in conformity with a direction of an upward pulling force exerted via the seat belt upon the upper rail, and the shoulder portion of the upper rail is so formed as to accommodate the end of the upper inverted-U-shaped portion of the lower rail, to thereby prevent the separation of the upper rail, from the lower rail.

10 Claims, 2 Drawing Sheets

SLIDE RAIL DEVICE FOR VEHICLE SEAT

BACKGROUND OF THE INVENTION

1. Field of the Invention

The present invention relates to a slide rail device used in a vehicle seat, an automotive seat or the like, which is adapted to adjust the forward and rearward positions of the seat, and in particular, relates to a slide rail device of the type having a seat belt provided on its upper rail and designed to avoid the separation of upper rail from lower rail in a sudden deceleration case due to a collision accident or the like.

2. Description of the Prior Art

Heitherto, there have been known various kinds of slide rail devices for vehicle seat, and among them, a type of the device has been in use, which has a seat belt anchored thereto in order to disperse a pulling force exerted on the seat belt to the floor of the vehicle and further so desinged to prevent the disengagement of its upper rail from its lower rail for safety purpose against a sudden deceleration case when a collision accident or the like occurs.

In this sort of slide rail device, one end portion of the seat belt is fixedly connected to its upper rail in most cases. The seat belt restrains an occupant who sits on the seat provided above the upper rail, and the restraint force of the seat belt is supported on the upper rail.

Various examples of such slide rail device exist as known, for example, from the Japanese Utility Model Publication No. 57-24594, or the U.S. Pat. No. 4,204,658.

Those prior art devices are basically similar to such construction as shown in FIG. 1 of the accompanying drawings. Hereinafter, the structural advantages and disadvantages of the prior art will be discussed with reference to the model in FIG. 1. Namely, in the prior art, a plurality of equidistant apertures (102) are formed in the shoulder portion (130) of an upper rail (114), and a plurality of engagement tooth (104), which are equidistant from one another corresponding to each of the apertures (102), are formed at the end of an upper curved flange portion (128) of a lower rail (112). The engagement tooth (104) are respectively disposed above each of the apertures (102). With this structure, in the case of a sudden deceleration due to a collision accident, the upper rail (114) is applied a pulling force (F) (See FIG. 2) which tends to raise the upper rail (114), and thus, as the upper raill (114) is moved upwardly, the tooth (104) of the lower rail (112) are inserted into and engaged in the respective apertures (102) of the upper rail (114), as shown in FIG. 2. Accordingly, the upper rail (114) are prevented from its separation from the lower rail (112).

However, the pulling force (F) being applied is, in fact, oriented obliquely in a directin inwardly of the slide rail device, as shown in FIG. 2. Such pulling force (F) is in turn exerted upon the upper curved flange portion (128) because of the full engagement of the tooth (104) in the respective apertures (102). Then, the upper curved flange portion (128), which is formed in a cantilever fashion, is easily bent upwards relative to a base point (a), with the result that the tooth (102) are raised at the same time, as illustrated in the phantom line in FIG. 2. This is, in the dynamic sense, attributed to a bending moment caused by the pulling force (F), and in particular, a greater amount of such bending moment is caused in the series of the tooth (102) disposed outwardly of the device (i.e. the one disposed on the left side as viewed in FIG. 2). As a result, there is a great likelihood of those outwardly disposed series of tooth (102) being disengaged out of their corresponding apertures (102) one by one. Thus, according to the present prior art, it is not possible to prevent the upper rail (114) against its separation from the lower rail (112), completely.

Of course, the foregoing problem can be solved by forming the upper and lower rails to have more thickness for increasing their rigidity against deformation. But, such formation of the upper and lower rails results in a more increased dimensions of the slide device as a whole, requiring a large sufficient room under the seat, and also results in a more increased weight of the device, which is not economical in costs for assemblage thereof and disadvantageous in providing a light weight of the seat.

Further, in contrast to the above-mentioned prior art, there has been such slide rail device as disclosed in the Japanese Laid-Open Utility Model Publication No. 49-106021. According to this another prior art, the upper rail is at its lower portion formed with a substantially U-shaped curved portion and the lower rail is also formed with a likewise curved portion in such a manner that the curved portion of the upper rail encloses that of the lower rail. Nevertheless, it is higly possible for the upper rail to be separated from the lower one, because when a great upward pulling force is exerted on the upper rail, the curved portion of the upper rail is easily opened, resulting in the upper rail being slipped off from the curved portion of the lower rail and separated therefrom.

SUMMARY OF THE INVENTION

In view of the above-mentioned drawbacks of prior arts, it is therefore a purpose of the present invention to provide a slide rail device for a vehicle seat which prevents the separation of its upper rail from its lower rail, positively, without necessity of designing the device body in a large dimensions and increased weight.

In accomplishing this purpose, according to the present invention, a lower rail is formed such as to enclose an upper rail entirely to thereby prevent the separation of the upper rail from the lower rail. In other words, the lower rail has an upper inwardly curved portion at its both ends and the lower rail is formed at its upper portion with a shoulder portion, the arrangement being such that the upper inwardly curved portion of the lower rail is disposed above the shoulder portion of the upper rail so as to receive a part of the shoulder portion, thus providing a limit against the upward movement of the upper rail, and further that the lateral wall portion of the lower rail adjacent the upper inwardly curved portion is oriented in a direction identical to a pulling force caused at a seat belt anchored at the upper rail, thereby avoiding deformation of the upper inwardly curved portion due to such pulling force.

In addition, the upper rail is further so formed that its shoulder portion is curved in a manner enclosing the end of the upper inwardly curved portion of the lower rail, whereby, when the upper rail is moved upwardly, the shoulder portion and its partial area sandwich the end of the upper inwardly curved portion, to ensure avoiding the deformation of the upper inwardly curved portion.

Accordingly, the reliability for preventing the saparation of both upper and lower rails is almost completely attained in comparison with the conventional slide rail devises.

DETAILED DESCRIPTION OF PREFERRED EMBODIMENT OF THE INVENTION

Referring to FIGS. 3 through 6, illustrative is an embodiment of slide rail device in accordance with the present invention.

As shown, the slide rail device is designated by numeral (10), which comprises a lower rail (12) fixed on a floor of vehicle (11) and an upper rail (14) slidably secured on the lower rail (12), on which upper rail is mounted a seat (not shown).

Figure 5:
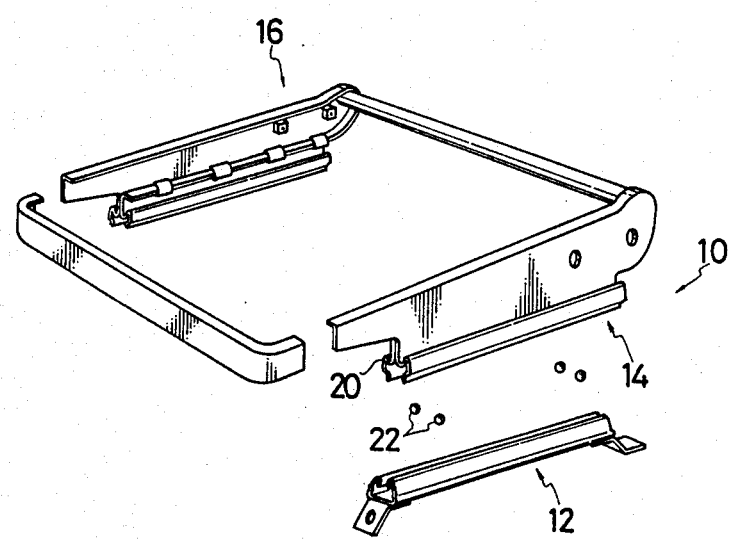
FIG. 5 is an exploded perspective view of the device in which an upper rail is integrally formed with a seat frame.
Figure 6:
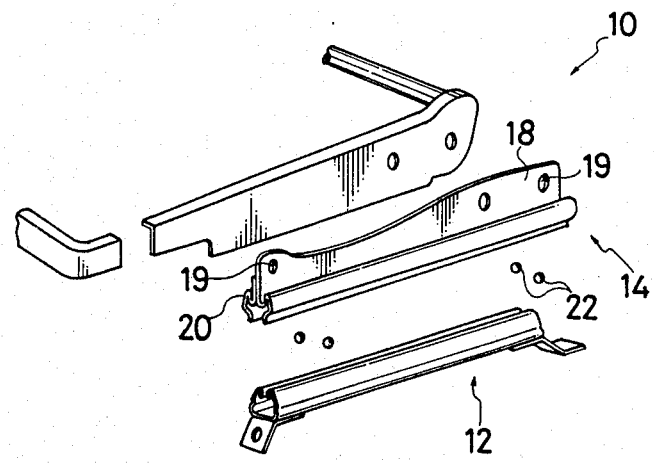
FIG. 6 is an exploded perspective view of the device which is formed independently of a seat frame.

A seat frame (16) may be integrally formed on the upper rail (14) as in FIG. 5, or may be formed independently of the upper rail (14) as in FIG. 6. In the latter embodiment, the upper rail (14) is fixed to the seat frame (16) by inserteing and fixing a suitable means such as a screw in a hole (19) perforated in the upper rail (14).

Hereinafter, a specific description will be given on the basis of such upper rail (14) separately from the seat frame (16) in FIG. 6.

Figure 1:
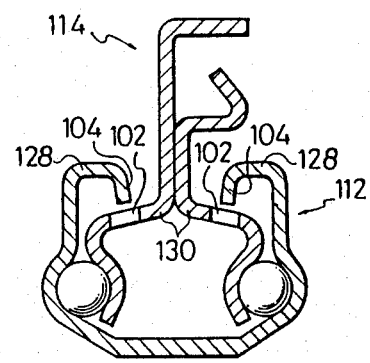
FIG. 1 is a cross-sectional view of a conventional device.
Figure 2:
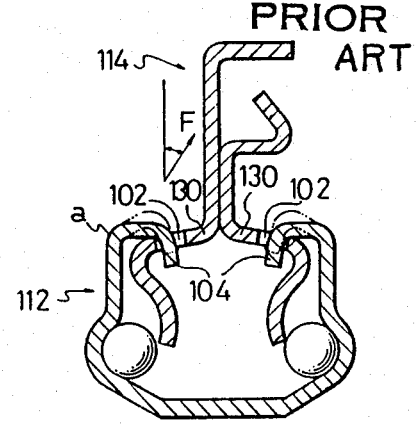
FIG. 2 is a cross-section view of the conventional device, showing the state in which a upward pulling force (F) is applied to the device.
Figure 3:
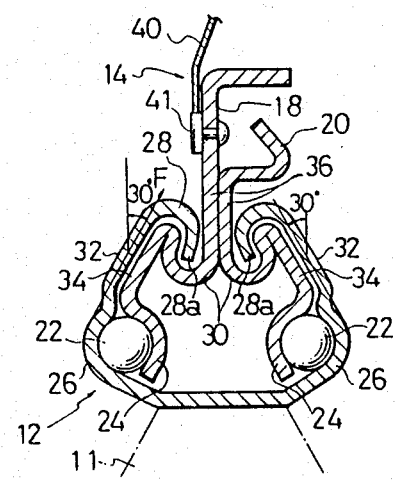
FIG. 3 is a cross-sectional view of a slide rail device in accordance with the present invention.

Referring now to FIG. 3, the upper rail (14) comprises a main plate (18) and an auxiliary plate (20), both of which are welded together, such that their lower portions extend downwardly in a bifurcated and symmetrical manner, and are each formed with a substantially U-shaped shoulder portion (30), a lateral wall portion (34) and an inwardly bent portion (24), all of those portions being integrally, continuously formed with each other. In this respect, a vertical portion (36) extends continuously upwardly from the inner end portion of the shoulder portion (3) while from the outer end portion of the shoulder portion (3), continuously downwardly extends the lateral wall portion (34), defining a protrudent bent portion (31) therebetween.

The lower rail (12) is formed by bending one unitary plate into a configuration enclosing the upper rail (14), such that it comprises a pair of upper inverted U-shaped portions (28) each terminating in an end (28a), a pair of inwardly inclined lateral wall portions (34), and a pair of lower outwardly curved portions (26).

Those upper and lower rails (14)(12) are assembled together in such a manner that the lower rail (12) encloses the upper rail (14) with its inwardly inclined lateral wall portions (34) and upper inverted U-shaped portions (28) extending respectively along the lateral wall portions (34) and substantially U-shaped shoulder portions (30), the upper inverted U-shaped portions (28) being disposed above the protrudent bent portions (31), respectively, and the ends (28) respectively of the upper inverted U-shaped portions (28) extending into each of the substantially U-shaped shoulder portions (38), and a steel ball (22) is embraced between the outwardly curved portion (26) (26) and inwardly bent portion (24) for the purpose of facilitating the sliding movement of the upper rail (14) along the lower rail (12). It may be arranged that a pair of the steel balls (22) are disposed at two points in the rails (14)(12), for instance, as in FIG. 5, so that vertical and horizontal forces being applied are effectively absorbed by the balls (22) for preventing the rattle of the rails (14)(12).

Designation (40) denotes a seat belt whose end portion is fixed to the vertical portion (36) of the upper rail (14) by means of a seat belt anchor means (41).

It is noted that the above-mentioned upper inverted U-shaped portions (28) of the lower rail (12) and substantially U-shaped shoulder portions (30) of the upper rail (14) are both so formed as to extend over the entire length of the rails (12)(14) in the longitudinal direction thereof.

As best shown in FIG. 3, the inwardly inclined lateral wall portions (32) of the lower rail (12) are of such arrangement that it is obliquely oriented in a direction indentical to a applying direction of an upward pulling force (F) which is exerted upon the upper rail (14) via the seat belt (40) in a sudden deceleration case due to a collision accident. Experiments in this regard show that in most cases an upward pulling force caused at a seat belt is directed obliquely at approx. 30-degree angle relative to a vertical line, and therefore, it is preferable that the inwardly inclined lateral wall portion (32) should be strictly oriented at 30-degree angle in conformity with the direction of the upward pulling force (F). But, such inclination may suffice if it falls within the angle ranges of 25 to 35 degrees.

With the above-mentioned structure, when the upward pulling force (F) is applied to the upper rail (14), tending to raise it up from the lower rail (12), the protrudent bent portion (31) and shoulder portion (30) of the upper rail (14) are brought to abutment against the upper inverted U-shaped portion (28) and its end (28a), of the lower rail (12), respectively. At this point, the upper inverted U-shaped portion (28) is applied a bending moment caused by the pulling force (F) and is being forcibly bent upwardly, but the inclination of the lateral wall portion (32) of lower rail (12) at an angle substantially conforming to the direction of the pulling force (F) serves to reduce the bending moment, whereupon the inverted U-shaped portion (28) is not easily bent or deformed upward.

In this context, it is preferable that the lateral wall portion (34) of the upper rail (14) be formed substantially in parallel with the inwardly inclined lateral wall portion (32). By being so formed, the latter portion (32) is to be brought to an entire contact with the former portion (34), when the bending moment is caused therein, so that the portion (34) acts as a limit against the bending of the one (32), thus preventing the deformation of the upper inverted U-shaped portion (28) in a more positive fashion.

Further, the substantially U-shaped shoulder portion (30) is of such construction as to accommodate the end (28a) of the upper inverted U-shaped portion (28) in an embracing manner, which more effectively avoids the deformation of the portion (28). Specifically, referring to FIG. 4, as the upper rail (14) is raised upwards due to the pulling force (F), the substantially U-shaped shoulder portion (30) of the upper rail (14) is raised accordingly to press upon the end (28a) of the upper inverted U-shaped portion (28) of the lower rail (12), and then, the end (28a) is sandwiched and retained between the protrudent bent portion (31) and vertical portion (36) of the upper rail (14), with the result that the protrudent bent portion (31) and vertical portion (36) cooperate to firmly grip the end (28a) of the upper inverted U-shaped portion (28) at a gripping area (38) in a frictional manner. This frictional gripping force caused at the gripping areas (38) is effective in preventing the deformation of the end (28a), and therefore the upper rail (14) is limited its upward movement by thus-retained end (28a) in a more assured way. Further, while the pulling force (F) is being applied, the shoulder portion (30) is contracted its U-shaped body due to the foregoing gripping effect, which renders the shoulder portion (30) per se more rigid against any other deformation, and with such increased structural rigidity, the frictional gripping of the end (28a) at the areas (38) becomes so positive as to not only enhance the prevention of the end (28a) against its slipping off from the should portion (30) but also ensure preventing the end (28a) from its deformation.

Accordingly, the end (28a) of the upper inverted U-shaped portion (28) is protected against deformation and functions to limit the upward movement of the upper rail (14). Also, the shoulder portion (30) of the upper rail (14) is prevented against both its deformation and upward displacement. The upper rail (14), therefore, is not raised any further, and its separation from the lower rail (12) is completely eliminated.

It is especially important to note that, the greater is applied the pulling force (F), the more firmly griped is the upper inverted U-shaped portion (28) of the lower rail (12) by the shoulder portion (30) of the upper rail (14), and thus, the device of the present invention is of a sufficient robust structure to withstand an extremely great pulling force exerted thereupon and to prevent its undesired deformation, and further it can be made of a relatively thin steel plate, allowing the production of small-sized and light-weight slide rail device having such robust structure ensuring to prevent the separation of the upper rail (14) from the lower rail (12).

While, in the embodiments having beein described before, the slide rail device (10) is proived on the right and left sides of the seat, it not aloways necesary to provide the device (10) in such fashion, but only one device (10) may be provided on the side of the seat where the seat belt (40) is attached. Practically, providing the device (10) on both sides of the seat, however, gives a much more reliability in preventing the separation of the rails (12)(14).

Figure 4:
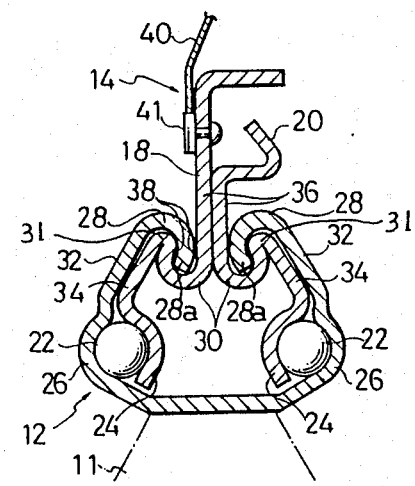
FIG. 4 is a cross-sectional view of the same device of the present invention, showing the state in which an upward pulling force has been applied to the device.

All the descriptions above have just been given of preferred embodiments of the present invention, but it should be understood that the invention is not limited to the embodiments illustrated but other replacements, modifications and addtions may structurally be possible without departing from the spirit of the appended claims for the invention. For example, in the illustrated embodiment, the lower portions of the main and auxiliary plates (18)(20) extend in a bifurcated and symmetrical manner, but the upper rail (14) may have only one lower portion of an identical shape to that of the main plate (18) at the same side (i.e. the lower portion of main palte (18) which is shown in FIGS. 3 and 4 as being disposed on the left), considering the fact that the obliquely applied pulling force (F) is mostly exerted on the lower portion of the main plate (18).

From the above description, it is accordingly appreciated that the slide rail device according to the present invention is so rigid as to withstand a great bending moment caused by an upper pulling force applied by an occupant about to be thrown out in a collision case, and as such the rail members thereof are almost completely prevented from deformation, and particularly, the upper inverted U-shaped portion (28) of the lower rail (12) is advantageously protected by the substantially U-shaped shoulder portion (30) against its deformation and slipping off from the device, whereby the portion (28) retains its function for limiting the upward movement of the upper rail (14), even if an extreme great pulling force is applied thereto. Thus, the separation of the upper rail (14) from the lower rail (12) is positively prevented.

Moreover, the upper and lower rail can be made of a relatively thin steel plate, and it is no longer necessary to form a thick cross-section of the rails, permitting the production of a small-sized and light-weight slide rail device having a sufficient rigidity.

What is claimed is:

1. A slide rail device for a vehicle seat comprising a lower rail fixed on a floor of said vehicle, an upper rail slidably fitted to said lower rail, and a seat belt which is at one end portion secured to said upper rail, wherein said lower rail includes an inwardly inclined lateral wall portion so formed that its upper part is inclined relative to its lower part in a direction inwardly of the lower rail, and further includes an upper inverted-U-shaped portion formed continuously from an upper end of said inwardly inclined lateral wall portion, and wherein said upper rail includes a lateral wall portion disposed under said inwardly inclined lateral wall portion of said lower rail, and further includes a substantially U-shaped shoulder portion formed continuously from said lateral wall portion, said shoulder portion being disposed under said upper inverted-U-shaped portion of said lower rail, whereby when an upward pulling force is exerted on said upper rail through said seat belt, said lateral wall portion of said upper rail is brought to contact with said inwardly inclined lateral wall portion and said substantially U-shaped shoulder portion of said upper rail is contracted to grip said upped-U-shaped portion of said lower rail, wherein said upper rail comprises a main plate and an auxiliary plate welded integrally to said main plate, such that the lower portions of said main and auxiliary plates extend in a bifurcated and symmetrical manner, and are each formed with said substantially U-shaped shoulder portion, said lateral portion, and a first curved portion adapted to retain a ball means, and wherein said lower rail comprises a flat bottom portion, a pair of outwardly inclined lateral wall portions which respectively extend upwardly from right and left sides of said flat bottom portion, and a second curved portion adapted to retain said ball means so that said ball means is embraced between said first and second curved portions, said second curved portion being formed continuously between said inwardly inclined lateral wall portion and said outwardly inclined lateral wall portion of said lower rail.

2. The slide rail device according to claim 1, wherein said inwardly inclined wall portion of said lower rail is inclined in conformity with a direction of said pulling force exerted on said seat belt.

3. The slide rail device according to claim 1, wherein said lateral wall portion of said upper rail is so formed as to extend in parallel with said inwardly inclined wall portion of said lower rail.

4. The slide rail device according to claim 1, wherein said lower rail is formed such that said inwardly inclined portion thereof is provided at least only at an outer side of said lower rail.

5. The slide rail device according to claim 1, wherein said upper inverted-U-shaped portion of said lower rail extends over an entire length of said lower rail in a longitudinal direction thereof, and said substantially U-shaped shoulder portion of said upper rail extends over an entire length of said upper rail in a longitudinal direction thereof.

6. The slide rail device according to claim 1, wherein said inwardly inclined lateral wall portion of said lower rail is inclined at an angle range from 25 degrees to 35 degrees relative to a vertical line.

7. The slide rail device according to claim 1, wherein a seat frame is integrally fixed on said upper rail.

8. The slide rail device according to claim 1, wherein a plurality of ball means are arranged between said first and second curved portions respectively of said upper and lower rails.

9. The slide rail device according to claim 1, wherein said substantially U-shaped shoulder portion is so formed as to accommodate an end portion of said upper inverted-U-shaped portion.

10. The slide rail device according to claim 1, wherein said slide rail device is provided only at one side of the seat where said seat belt is secured.

* * * * *